US009354959B2

(12) United States Patent
Embree et al.

(10) Patent No.: US 9,354,959 B2
(45) Date of Patent: *May 31, 2016

(54) METHOD AND SYSTEM TO PROCESS ISSUE DATA PERTAINING TO A SYSTEM

(71) Applicant: eBay Inc., San Jose, CA (US)

(72) Inventors: Kevin H Embree, Austin, TX (US); Ellen Silver, San Jose, CA (US)

(73) Assignee: eBay Inc., San Jose, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/850,232

(22) Filed: Mar. 25, 2013

(65) Prior Publication Data

US 2013/0219232 A1    Aug. 22, 2013

Related U.S. Application Data

(63) Continuation of application No. 12/416,095, filed on Mar. 31, 2009, now Pat. No. 8,407,317, which is a continuation of application No. 10/748,538, filed on Dec. 29, 2003, now Pat. No. 7,558,834.

(51) Int. Cl.
*G06F 11/07* (2006.01)
*G06Q 30/02* (2012.01)

(52) U.S. Cl.
CPC ............ *G06F 11/0781* (2013.01); *G06Q 30/02* (2013.01)

(58) Field of Classification Search
CPC  G06Q 30/02; H04L 41/0631; H04L 41/5022; H04L 41/0677; H04L 41/5019; H04L 41/5032; H04L 43/0829; H04L 67/322; G06F 11/0781; G06F 2201/87; G06F 11/079; G05B 23/0278
USPC .................................. 709/217–219, 223–225
See application file for complete search history.

(56) References Cited

U.S. PATENT DOCUMENTS

| 5,132,920 | A | * | 7/1992 | Bellows et al. ............... 702/184 |
| 5,287,505 | A | * | 2/1994 | Calvert et al. |
| 5,528,759 | A | | 6/1996 | Moore |
| 5,734,838 | A | | 3/1998 | Robinson et al. |
| 5,895,450 | A | | 4/1999 | Sloo |

(Continued)

FOREIGN PATENT DOCUMENTS

| TW | 200302429 A | 8/2003 |
| TW | I372972 B | 9/2012 |
| WO | WO-2005065252 A2 | 7/2005 |
| WO | WO-2005065252 A3 | 7/2005 |

OTHER PUBLICATIONS

"U.S. Appl. No. 10/748,538, Final Office Action mailed Jul. 11, 2008", 31 pgs.

(Continued)

*Primary Examiner* — Catherine Thiaw
(74) *Attorney, Agent, or Firm* — Schwegman, Lundberg & Woessner, P.A.

(57) ABSTRACT

A computer-implemented method to processes issue data in a system is provided. A network is monitored for a violation of a parameter defined by rules. The violation is reported in an issue report categorized by a predefined issue type. Issue description and location identifying information where an issue of the issue report occurs are identified. A predefined response activity for responding to the issue is determined. An action based on the predefined response activity is triggered. The issue and the response activity is logged.

20 Claims, 14 Drawing Sheets

(56) References Cited

U.S. PATENT DOCUMENTS

| | | | |
|---|---|---|---|
| 6,058,114 A | | 5/2000 | Sethuram et al. |
| 6,434,533 B1 | | 8/2002 | Fitzgerald et al. |
| 6,609,050 B2 | | 8/2003 | Li |
| 6,650,949 B1 * | 11/2003 | Fera et al. ............... 700/79 |
| 6,941,557 B1 | | 9/2005 | Jakobson et al. |
| 6,993,586 B2 | | 1/2006 | Chen et al. |
| 7,051,098 B2 | | 5/2006 | Masters et al. |
| 7,103,795 B1 | | 9/2006 | Hansen |
| 7,120,589 B1 | | 10/2006 | Szabo et al. |
| 7,155,510 B1 | | 12/2006 | Kaplan |
| 7,225,139 B1 | | 5/2007 | Tidwell et al. |
| 7,302,397 B1 | | 11/2007 | Hein et al. |
| 7,340,037 B1 | | 3/2008 | Jean et al. |
| 7,363,193 B2 | | 4/2008 | Jacobs et al. |
| 7,469,287 B1 * | 12/2008 | Castillo et al. ............ 709/224 |
| 7,516,438 B1 | | 4/2009 | Leonard et al. |
| 7,558,834 B2 | | 7/2009 | Embree et al. |
| 7,577,701 B1 * | 8/2009 | Johns et al. ............... 709/203 |
| 7,668,953 B1 * | 2/2010 | Sinclair et al. ............ 709/224 |
| 7,694,115 B1 | | 4/2010 | Porras et al. |
| 7,734,764 B2 | | 6/2010 | Weiner et al. |
| 8,332,502 B1 * | 12/2012 | Neuhaus et al. ........... 709/224 |
| 8,407,317 B2 | | 3/2013 | Embree et al. |
| 2002/0052718 A1 * | 5/2002 | Little et al. ............... 702/188 |
| 2002/0120734 A1 * | 8/2002 | Riosa et al. ............... 709/224 |
| 2003/0041291 A1 | | 2/2003 | Hashem et al. |
| 2003/0055804 A1 | | 3/2003 | LaButte et al. |
| 2003/0088510 A1 * | 5/2003 | Yokota et al. ............. 705/38 |
| 2003/0097617 A1 * | 5/2003 | Goeller et al. ............ 714/39 |
| 2003/0208497 A1 | | 11/2003 | Witter et al. |
| 2003/0208523 A1 * | 11/2003 | Gopalan et al. ........... 709/201 |
| 2004/0039586 A1 * | 2/2004 | Garvey et al. ............. 705/1 |
| 2004/0117354 A1 * | 6/2004 | Azzaro et al. ............. 707/3 |
| 2004/0128295 A1 * | 7/2004 | Adi et al. ................. 707/100 |
| 2004/0143636 A1 | | 7/2004 | Horvitz et al. |
| 2004/0153693 A1 | | 8/2004 | Fisher et al. |
| 2004/0181685 A1 | | 9/2004 | Marwaha |
| 2004/0205398 A1 * | 10/2004 | Osborn et al. ............ 714/25 |
| 2005/0010461 A1 * | 1/2005 | Manos ..................... 705/8 |
| 2005/0080857 A1 | | 4/2005 | Kirsch et al. |
| 2005/0160330 A1 | | 7/2005 | Embree et al. |
| 2006/0031938 A1 * | 2/2006 | Choi ....................... 726/25 |
| 2007/0234426 A1 | | 10/2007 | Khanolkar et al. |
| 2009/0199054 A1 | | 8/2009 | Embree et al. |

OTHER PUBLICATIONS

"U.S. Appl. No. 10/748,538, Non-Final Office Action mailed Dec. 13, 2007", 35 pgs.

"U.S. Appl. No. 10/748,538, Notice of Allowance Mailed Nov. 19, 2008", 7 Pgs.

"U.S. Appl. No. 10/748,538, Response filed Apr. 14, 2008 to Non-Final Office Action mailed Dec. 13, 2008", 16 pgs.

"U.S. Appl. No. 10/748,538, Response filed Oct. 14, 2008 to Final Office Action mailed Jul. 11, 2008", 18 pgs.

"U.S. Appl. No. 12/416,095 Non-Final Office Action mailed Aug. 26, 2010", 23 pgs.

"U.S. Appl. No. 12/416,095, Final Office Action mailed Mar. 7, 2011", 28 pgs.

"U.S. Appl. No. 12/416,095, Notice of Allowance mailed Nov. 26, 2012", 16 pgs.

"U.S. Appl. No. 12/416,095, Response filed Jun. 1, 2011 to Final Office Action mailed Mar. 7, 2011", 11 pgs.

"U.S. Appl. No. 12/416,095, Response filed Dec. 21, 2010 to Non Final Office Action mailed Aug. 26, 2010", 13 pgs.

"Chinese Application Serial No. 200480039458.2, Office Action mailed Jul. 6, 2007", 11 pgs.

"Chinese Application Serial No. 200480039458.2, Response filed Nov. 20, 2007 to Office Action mailed Jul. 6, 2007", 53 pgs.

"Chinese Application Serial No. 200810132076.4, Office Action mailed Mar. 10, 2010", 3 pgs.

"Chinese Application Serial No. 200810132076.4, Office Action mailed May 31, 2011", 12 pgs.

"Chinese Application Serial No. 200810132076.4, Office Action mailed Sep. 9, 2010", 10 pgs.

"Chinese Application Serial No. 200810132076.4, Office Action Response filed Dec. 24, 2010", 6 pgs.

"Chinese Application Serial No. 200810132076.4, Office Action Response Filed: Jul. 22, 2010", 9 pgs.

"European Application Serial No. 04817049.2, Seach Report mailed May 7, 2008", 3 pgs.

"International Application Serial No. PCT/US2004/043213, International Preliminary Report on Patentability mailed Aug. 14, 2006", 4 pgs.

"International Application Serial No. PCT/US2004/043213, International Search Report and Written Opinion mailed Jul. 11, 2006", 10 pgs.

"Taiwanese Application Serial No. 093139802, Notice of Allowance mailed Jun. 26, 2012", with English translation.

"Taiwanese Application Serial No. 093139802, Office Action mailed Jan. 13, 2012", with English translation of claims, 9 pgs.

"Taiwanese Application Serial No. 093139802, Response filed Mar. 27, 2012 to Office Action mailed Jan. 13, 2012", with English translation of claims, 38 pgs.

* cited by examiner

METHOD AND SYSTEM TO PROCESS ISSUE DATA PERTAINING TO A SYSTEM

RELATED APPLICATION

This application is a continuation of and claims the benefit of priority to U.S. patent application Ser. No. 12/416,095, entitled "METHOD AND SYSTEM TO PROCESS ISSUE DATA PERTAINING TO A SYSTEM", filed on Mar. 31, 2009, which is a continuation of application Ser. No. 10/748, 538, filed on Dec. 29, 2003, which applications are hereby incorporated by reference in their entirety.

FIELD OF THE INVENTION

The present invention relates generally to the technical field of system maintenance and, in one exemplary embodiment, to methods and systems to process issue data, received from the reporting entity, and reporting issues pertaining to a system.

BACKGROUND OF THE INVENTION

As computer systems, networks, and databases that are accessed via such computer systems or networks, have become more widely used and sophisticated, the monitoring of the functioning and usage of these resources has presented an increasing technical challenge. In order to detect issues and problems that may exist with respect to a particular system, an operator of the system may deploy automated monitoring agents to monitor the system and automatically to report any issues that arise in connection with the system. Further, an operator of the system may provide tools and mechanisms to users of the system so as to enable users to report any issues, of which they become aware, to an administrative person or organization. Such an administrative person or organization will typically then, if appropriate, take action responsive to the reported issue.

As the number of sources, both human and automated, from which an administrative entity may receive issue reports increases, the processing and handling of these issue reports may present a technical challenge to the administrative entity. For example, the sheer volume of issues that are reported may overwhelm the handling resources of an administrative entity.

The above issues pertaining to the processing of issue reports are amplified by a number of factors, such as an increase in the complexity or rules pertaining to the operation of a system (e.g., an online resource of forum), and an increase in the number of sources from which issue reports may originate.

FIG. 1 is a block diagram illustrating a prior art system 2 for the handling of issue reports received from a user 3. Specifically, the user 3 submits issue data to a reporting engine 4, the issue data pertaining to an issue, for example, encountered or detected with respect to a system. The issue reporting engine 4 then communicates this data to a messaging system 5, which provides an auto-response or an auto-acknowledgment (e.g., users may receive a more formal response from a customer service representative after an investigation) e-mail back to the user 3, and also creates an issue report message, including the issue data. The issue report message is then placed into one or more queues 6, each of which is serviced by an agent. Specifically, the agent may retrieve an issue message from the associated queue 6, evaluate the issue, and take action, if warranted, to address the issue.

Consider the situation where the prior art system 2, described above with reference to FIG. 1, is utilized to communicate an increasingly large number of issue reports, received from a large number of diverse users 3 regarding a particularly complex system. Assuming the queues 6 are serviced by an associated agent in a first-in, first-out (FIFO) manner, an increasing number of agents 8 are required to service received issue reports. Further, issue reports that perhaps require urgent attention become more difficult to recognize as the number of received issue reports, and the potential subject matter of such issue reports, increases. Accordingly, the processing of issue reports, for example, by using a prior art system 2 such as that shown in FIG. 1, presents a number of technical challenges such as, for example, dealing with an increasing number of issue reports pertaining to an ever-increasing number of topics and issues.

SUMMARY OF THE INVENTION

According to one aspect of the present invention, there is provided a computer-implemented method to process issue data in a system. A plurality of issue reports are received from respective reporting entities, each issue report being indicative of a reported issue in the system which requires a corresponding response activity. The issue reports are parsed by use of a processor to obtain priority criterion data relating to at least one priority criterion. The priority criterion is unrelated to the dates and/or times of the issue reports and may include visibility data, severity data, exposure data, and/or performance data relating to past performance of a reporting entity and/or a reported entity. The reported issues are then automatically prioritized by applying to each reported issue an issue priority based at least partially on the associated priority criterion data. Thereafter, at least some of the reported issues are communicated to an agent to perform corresponding response activities, the response activities to be performed in order of their issue priorities.

Other features of the present invention will be apparent from the accompanying drawings and from the detailed description that follows

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to process issue data in a system are described. In the following description, for purposes of explanation, numerous specific details are set forth in order to provide a thorough understanding of the present invention. It will be evident, however, to one skilled in the art that the present invention may be practiced without these specific details.

An exemplary embodiment of the present invention is discussed below within the context of an electronic commerce platform. However, it will be appreciated that the described commerce platform is merely exemplary of a system regarding which issues may be reported. Accordingly, systems and methodologies described below to process issue data should be understood to be exemplary, and not limited to a commerce system. Indeed, it is believed that the broad teachings and principles of the present invention may find application in processing issue data pertaining to a wide variety of systems.

Platform Architecture

Figure 1:
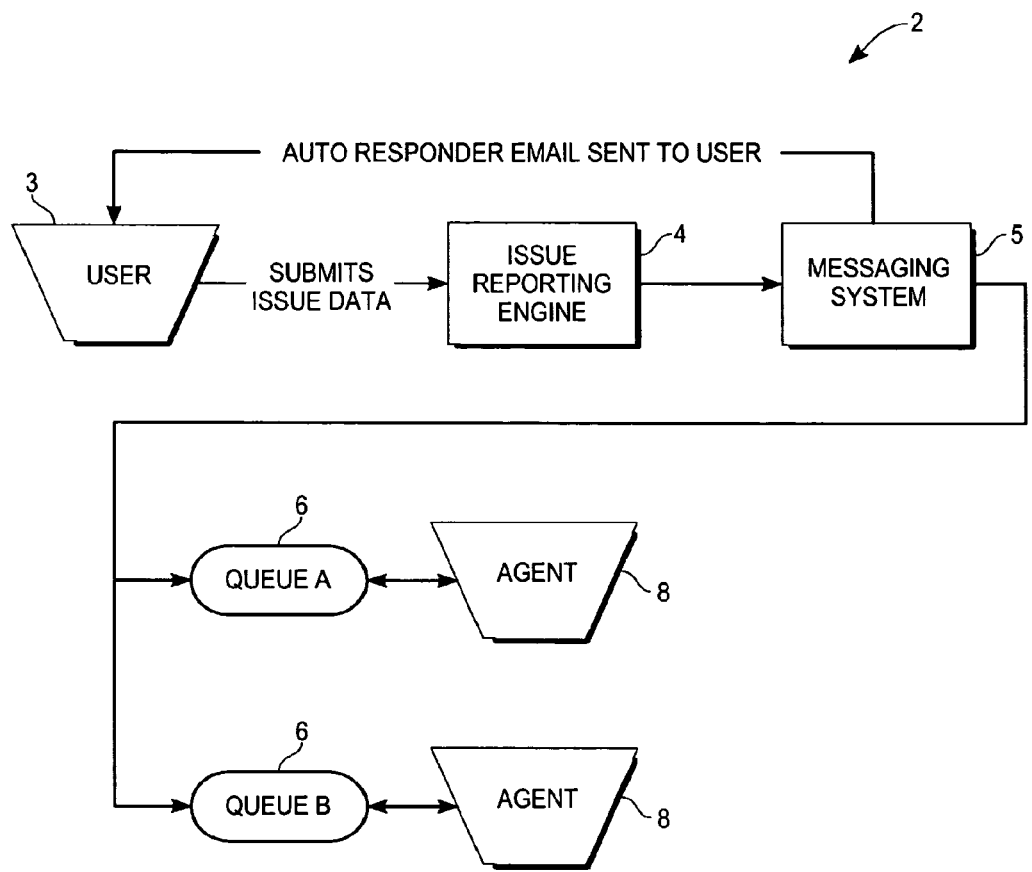
FIG. 1 is a block diagram illustrating a prior art system for the handling of issue reports received from a user.
Figure 2:
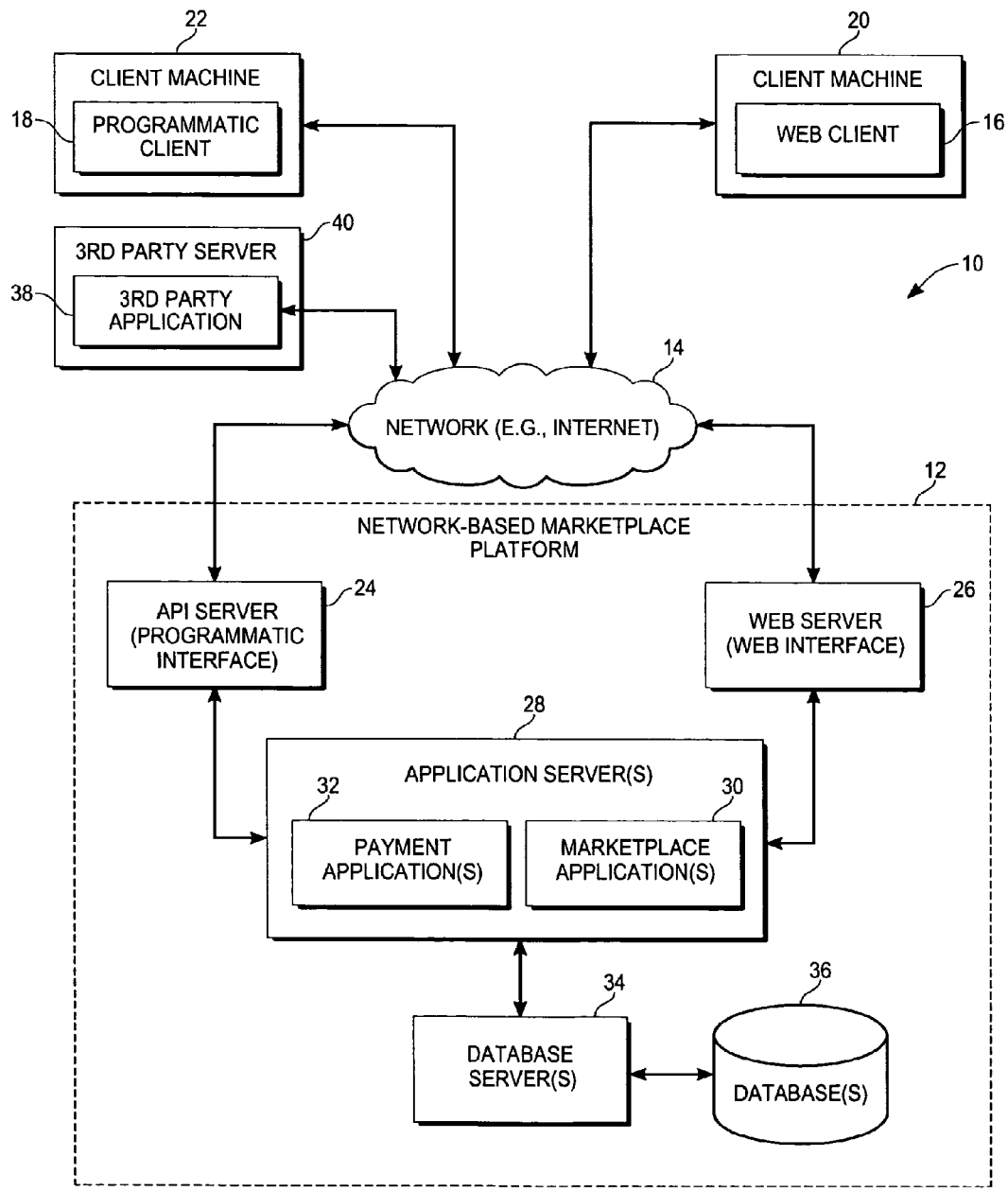
FIG. 2 is a schematic diagram depicting a system, according to one exemplary embodiment of the present invention, having a client-server architecture regarding which issues may be reported, and within which the processing of issue reports may be performed.

FIG. 2 is a schematic diagram depicting a system 10, according to one exemplary embodiment of the present invention, having a client-server architecture. A commerce platform, in the exemplary form of a network-based marketplace 12, provides server-side functionality, via a network 14 (e.g., the Internet) to one or more clients. FIG. 2 illustrates, for example, a web client 16 (e.g., a browser, such as the Internet Explorer browser developed by Microsoft Corporation of Redmond, Washington State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 2 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 2 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 2 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 3:
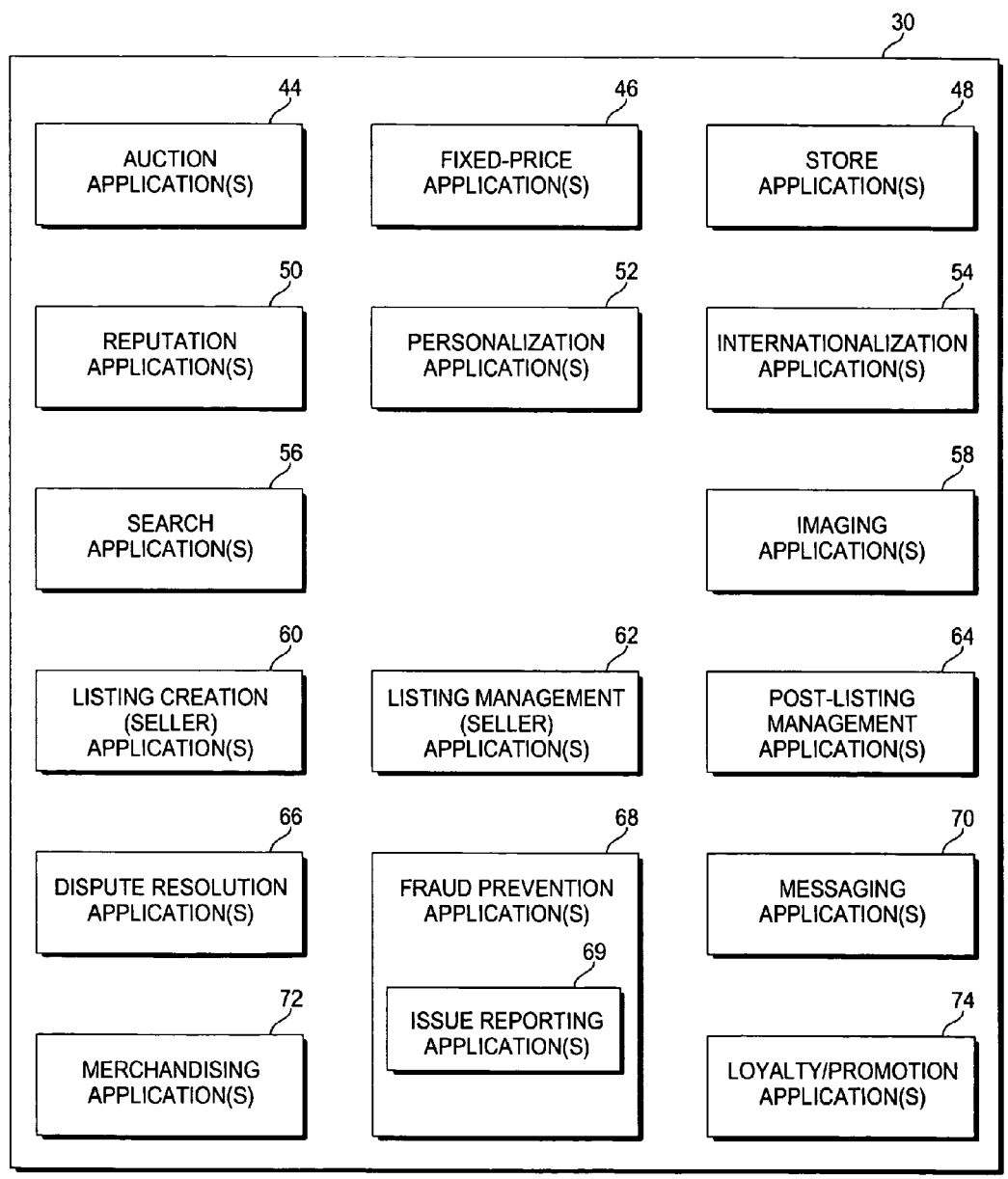
FIG. 3 is a block diagram illustrating multiple marketplace and payment applications that, in one exemplary embodiment of the present invention, are provided as part of a network-based marketplace.

FIG. 3 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buy-out-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12. One such fraud prevention application 68 is an issue reporting application 69, according to an exemplary embodiment of the present invention, that automates the prioritization of issues that are reported to the network-based marketplace 12, and that also provides a number of functions and features that automate and make more convenient the reporting of issues, for example to the administrator of the network-based marketplace 12, by users and other reporting entities. Further details regarding an exemplary embodiment of an issue reporting application 69, in the form of an issue correlation and prioritization engine 128, are provided below.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 4:
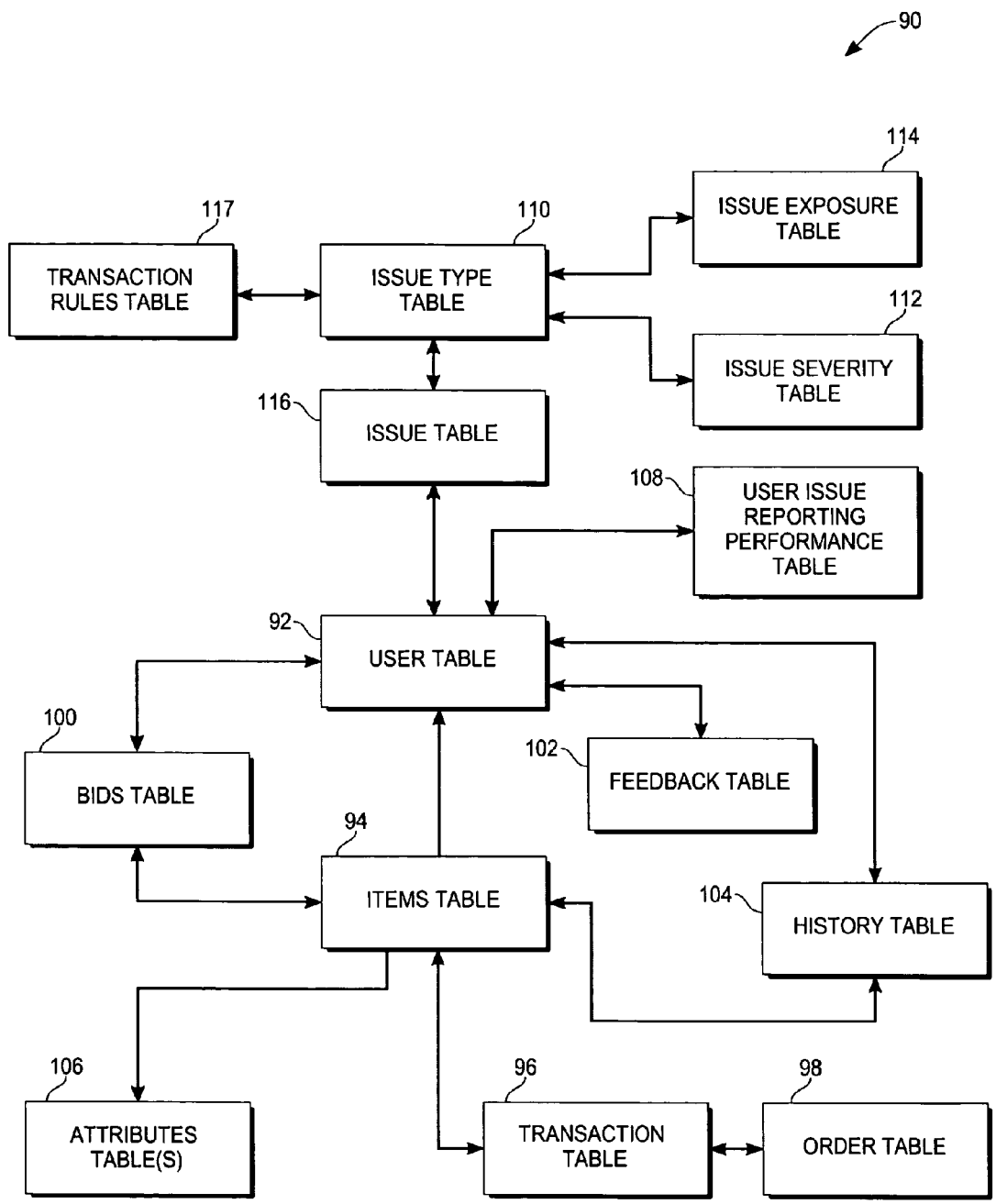
FIG. 4 is a high-level entity-relationship diagram, illustrating various tables that may be maintained within databases 36 accessed by marketplace and payment applications of the network-based marketplace.

FIG. 4 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present invention, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

The tables 90 are also shown to include a user issue reporting performance table 108, which is populated with the records of performance data indicative of a past performance of a user in reporting issues to the network-based marketplace 12. For example, records within the performance table 108 may record in a false positive rate (or count), and a user's historical accuracy or correctness in reporting issues. As will be described in further detail below, the performance data stored within the performance table 108 for each user (or reporting entity) may continually be updated based on the accuracy or validity of issue data that the relevant user submits to the network-based marketplace 12.

In order to increase the ease with which issues reported to the network-based marketplace 12 can be processed and analyzed, a number of predefined issue types (or categories) may be defined. Issues reported to the marketplace 12 may then be categorized according to these predefined issue types. To this end, the tables 90 include an issue type table 110 that contains a record for each predefined issue type recognized by the marketplace 12. For example, issues may be categorized as relating to fraud, prohibited selling practices, or the transacting of stolen property. In one embodiment of the present invention, an issue category tree structure may be defined according to which issues may be categorized with increasing levels of granularity.

Further, such an issue category tree may differentiate issue types based not only on the specific issue action, but also utilizing subject matter of a specific transaction to which the issue pertains. For example, the issue type "transacting stolen property-art category" may be differentiated from the issue type "transacting stolen property-toys category."

An issue severity table 112, and an issue exposure table 114 may also be associated with the issue type table 110. The issue severity table 112 is populated with records that include a predetermined severity level for each of the issue types for which a record exist within the issue type table 110. For example, the severity level (or value) associated with a prohibited selling practice may be less than the severity level associated with the transacting of stolen property.

Similarly, the issue exposure table 114 may be populated with records that include a predetermined exposure value for each of the issue types. The exposure value is, in the exemplary embodiment, indicative of a potential loss or liability that may be faced by parties to a particular transaction, or by the marketplace 12, in the event that the issue is not addressed. Further, a higher exposure value may be associated with the transacting of stolen property in an art items category of the marketplace 12 that is associated with the transacting of stolen property in a toys category, for example.

An issue table 116 is populated with a record for each issue that is reported to the network-based marketplace 12, each such record containing details pertinent to the respective reported issue. These details may include, for example, the identity of both the reporting entity (e.g., the reporter), and the reported entity. The issue table 116 is according to shown to be associated with the user table 92, and appropriate applications are accordingly able to obtained a history of issues that have been reported to the marketplace 12 by or concerning a particular user or other entity.

The tables 90 also include a transaction rules table 117 that is populated with records defining a number of transaction rules that govern transaction practices within the marketplace 12. For example, the transaction rules specified within the transaction rules table 117 may define practices and procedures that are required to validly transact within the marketplace 12, and may also specify certain practices or activities that are specifically banned or excluded from the marketplace 12. For example, such transaction rules may specify parameters or activities utilizing which shilling bidding with respect to items offered for sale via the marketplace 12 may be detected. The various rules defined within the transaction rules table 117 may be enforced by a rules engine 124, which is further described below with reference to FIG. 5.

Figure 5:
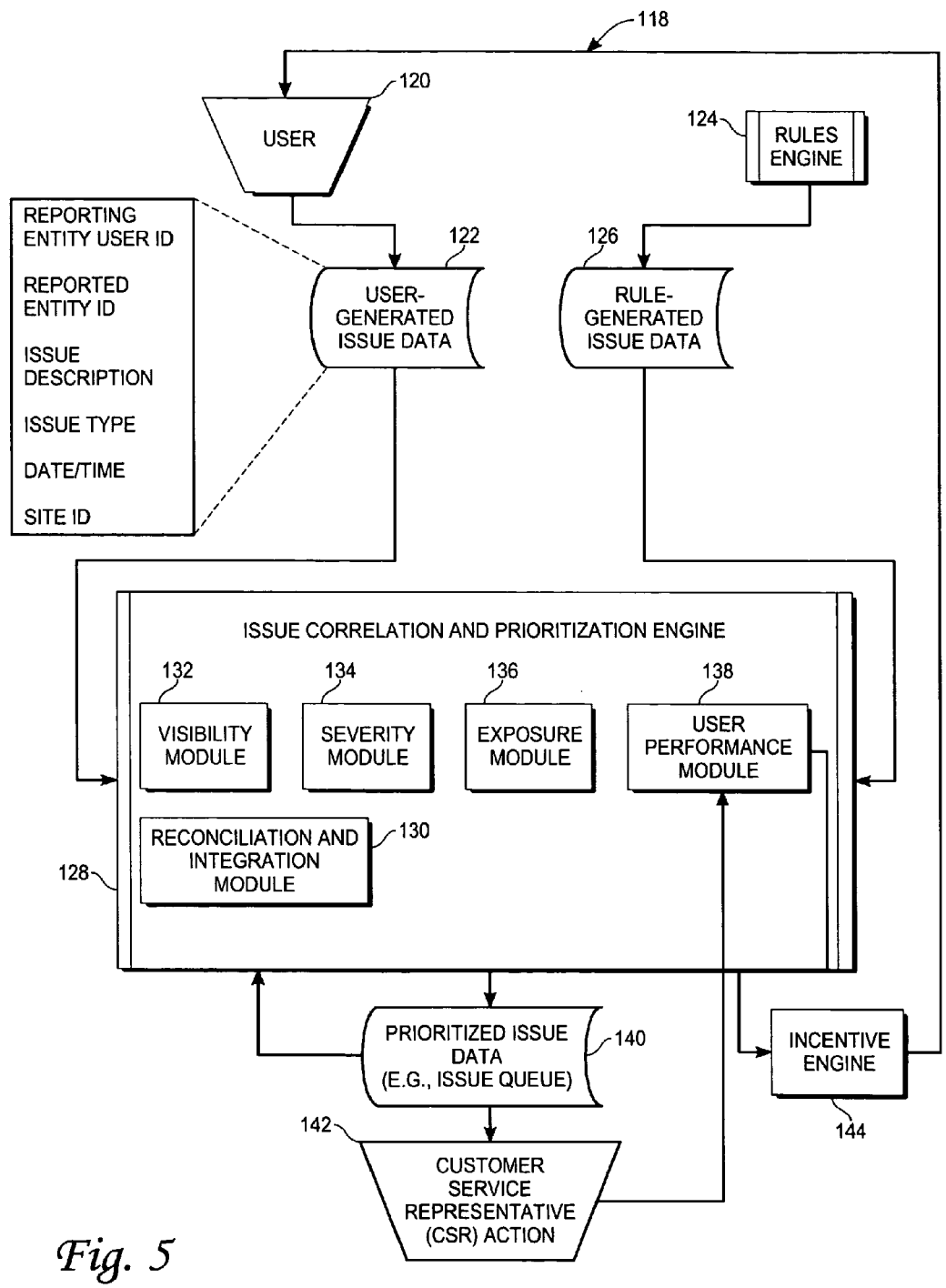
FIG. 5 is a block diagram illustrating, at a high level, the architecture of an issue processing system, according to an exemplary embodiment of the present invention.

FIG. 5 is a block diagram illustrating, at a high level, the architecture of an issue processing system 118, according to an exemplary embodiment of the present invention. Reporting entities, in the exemplary form of a human user 120 and a rules engine 124, are shown to communicate user-generated issue data 122 and rule-generated issue data 126, respectively, to an issue correlation and prioritization engine 128. Within the context of the system 10 shown in FIG. 2, the user 120 may be a user who utilizes a client machine 22 to communicate with the network-based marketplace 12. The user may become aware of an issue pertaining to the network-based marketplace 12, and wish to report this issue to an administrator or operator of the marketplace 12. Such issues may, for example, be of a technical nature (e.g., the user is unable to access a particular service or function provided by the marketplace 12), or may be of a commercial nature (e.g., the user 120 has become aware of a trading practice that is in violation of transaction rules that govern transaction practices within the marketplace 12). The user 120 may also be actively tasked with monitoring items that are offered for sale via the marketplace 12 to detect illegal transaction activities. For example, the user may monitor the marketplace 12 for the listing of counterfeit or banned items. The user 120 may be employed by a law enforcement agency and monitor activity within the marketplace 12 on behalf of that agency. The user could also, for example, be employed by a copyright owner (e.g., a movie studio or software company) to identify the listing of counterfeit or copyright-infringing items. The user 120 may also be a party to a transaction that, for one or other reason, is unsatisfied with the manner in which a relevant transaction was conducted. For example, the user 120 may have, via the marketplace 12, entered into an agreement to purchase some item, made a payment to a seller, and then not have received the relevant item from the seller. In this case, there is a possibility that the seller may be a fraudulent seller, in which case the user-generated issue data may identify this issue.

As discussed above with reference to FIG. 3, the marketplace applications 30 may also include a reputation application 50, whereby users may establish reputations within the marketplace 12. These reputations may be important to users, as they are typically heavily utilized by potential trading partners when assessing the desirability of trading with a particular user. Accordingly, users 120 tend to be very protective of their reputations, and a negative comment within reputation information concerning a particular user 120 may be highly damaging to a user 120. Transaction rules enforced within the marketplace 12 may specify guidelines regarding the providing of feedback between users, in order to counter abuse of this system. The user-generated issue data 122 communicated from the user 120 to the issue correlation and prioritization engine 128 may thus also report an issue pertaining to feedback that has been recorded at the marketplace 12 by or regarding the particular user 120. For example, the user 120 may have been subject to so-called "feedback extortion", whereby another user threatens to leave a negative feedback regarding the user 120 unless the user 120 undertakes a predetermined action (e.g., leaves positive feedback regarding the extorting user).

The rules engine 124 is an automated agent that may, in one embodiment, monitor certain parameters with respect to a system, such as the network-based marketplace 12. For example, the rules engine 124 may monitor technical aspects of the various computer systems and databases that support the marketplace 12, and may also monitor activity within the marketplace 12 automatically to detect violations of transaction rules defined, for example, in the transaction rules table 117. The rules engine 124 may automatically monitor known aliases for users operating within the marketplace 12 in an attempt to automatically detect shill bidding activities that artificially inflate prices for items being offered for sale. It will be appreciated that the rules engine 124 may monitor a large number of technical and/or activity parameters with a view to detecting issues to be reported to the issue correlation and prioritization engine 128.

FIG. 5 also illustrates data that may be included within the user-generated or the rule-generated issue data 122 or 126. For example, the issue data may include a reporting entity identified (e.g., user identifier), a reported entity identifier (e.g., a violator identifier, where such a violator is identifiable by the user 120), an issue description (e.g., which may be selected from a predetermined list or menu of issue descriptions presented to the user 120), an issue type (e.g., that may also be user-selected from a predetermined list of issue types), date and time information, and site identifier information, where the marketplace 12 may, for example, supports a number of web sites at which trading may be conducted.

The issue correlation, and prioritization engine 128, according to one exemplary embodiment of the present invention, operates to correlate issue data 122 and/or 126 (e.g., on the basis of reporting a common issue) and also to prioritize issue data, for example, within an issue queue prior to the issue data being presented or considered for a response activity. To this end, the engine 128 is shown to include a reconciliation and integration module 130 that performs initial processing of issue data 122 and 126 received at the engine 128. Specifically, the reconciliation and integration module 130 is responsible for reconciling issue data, received from multiple sources (e.g., from multiple users 120 and multiple rules engines 124) based on, for example, the relevant issue data reporting of a common issue. Consider the situation in which a human user 120 and a rules engine 124 may each communicate issue data 122 and 126, respectively, reporting a common issue. In this instance, the reconciliation and integration module 130 recognizes the common issue, and reconciles the two sets of issue data, and then integrates the two sets of issue data. The module 130, to this end, may include logic that parses the issue description, issue type, date and time, and site identifying information included within the issue data, and performs the reconciliation and integration based on this data. The parsing of issue data may be performed within the reconciliation and integration module 130 itself, or may alternatively be performed by a visibility module 132, as described in further detail below.

The visibility module 132, a severity module 134, an exposure module 136, and a user performance module 138 operate to then prioritize the reconciled and integrated issue data, which is then outputted as prioritized issue data 140, for example, an issue queue. From the issue queue, the prioritized issue data 140 may then be provided to a customer service representative (CSR), for example, for a response activity. Where the reported issue pertains to an illegal listing within the marketplace 12, the customer service representative may remove the listing from the marketplace 12. Alternatively, where the issue is of a more technical nature, the customer service representative may initiate an appropriate technical response activity. The prioritized issue data 140 may also be reported to any entity or person that is able to initiate, or in fact perform, a suitable response activity.

FIG. 5 also shows the response activity as providing feedback into the user performance module 138 that, as will be described in further detail below, operates to update the performance data of one or more reporting entities based on the response activity and/or on an assessment of the issue data by the customer service representative. For example, where the customer service representative flags the relevant issue data as being a "false positive" (e.g., the issue is without merit), the performance data of the reporting entity (or multiple reporting entities) may be updated to reflect this "false positive". On the other hand, should the issue in fact be assessed to be a valid issue, then the performance data of the reporting entity (or multiple reporting entities) will similarly be updated.

An incentive engine 144 may receive input from the issue correlation and prioritization engine 128, or directly from the customer service representative action 142, and, responsive to at least one of these inputs, provide an incentive award to a user 120 based on either the assessed accuracy or validity of a specific set of issue data reported, or based on the performance data indicating that the past performance of the reporting entity in identifying and reporting issues has exceeded a predetermined award threshold.

Figure 6:
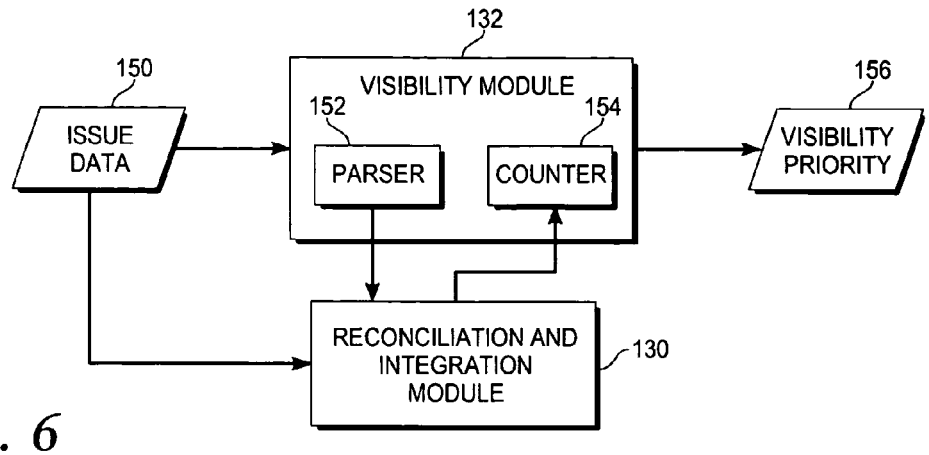
FIG. 6 is a block diagram illustrating an exemplary architecture of a visibility module, which operates to provide a quantitative assessment of the number of times a specific issue, or an entity associated with the system, has been the subject of a reported issue.

FIGS. 6-10 are block diagrams providing further detail regarding the architecture, data structures, inputs and outputs of the various components of the issue correlation and prioritization engine 128, shown in FIG. 5. Specifically, FIG. 6 is a block diagram illustrating an exemplary architecture of the visibility module 132, which operates to provide a quantitative assessment of the number of times a specific issue, or an entity associated with the system, has been the subject of a reported issue. Issue data 150 is shown to be inputted to the visibility module 132, and to the reconciliation and integration module 130. A parser 152 within the visibility module then deconstructs the issue data, and communicates this deconstructed issue data to the reconciliation and integration module 130. The visibility module 132 is also shown to include a counter 154, which receives inputs from the reconciliation and integration module 130, so as to enable the visibility module 132 to maintain a count of the number of times a specific issue, or entity associated with a system, has been the subject of a reported issue. Based on this information, the visibility module 132 then outputs a visibility priority 156, which is a priority indication, optionally to be associated with the issue data 150, based on a quantitative assessment of the number of times a specific issue, or entity, has been the subject of the reported issue. The visibility priority 156 may, for example, be a numeric indication, normalized according to a predetermined visibility scale.

Figure 7:
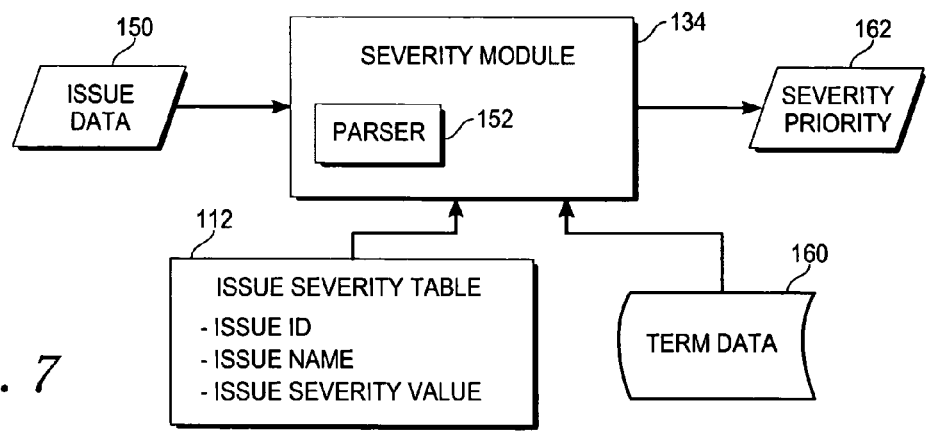
FIG. 7 is a block diagram illustrating details regarding a severity module, according to an exemplary embodiment of the present invention.

FIG. 7 is a block diagram illustrating details regarding the severity module 134, according to an exemplary embodiment of the present invention. The severity module 134 is also shown to receive the issue data 150, which is deconstructed by a parser 152. The severity module 134 may then, in a first operation, perform a look up utilizing the issue severity table 11, to retrieve a stored issue severity value that is attributed to a specific issue type. In a further operation, the severity module 134 may perform an analysis of terminology included within the issue description in an attempt to further infer or identify an issue type. To this end, term data 160 is also shown to be retrieved by the severity module 134, and compared to terms included within the issue description, for example, in an attempt to further confirm or identify an issue being reported. Based on a retrieved issue severity value, and/or other issue type identification determined as a result of the term analysis, the severity module 134 may then output a severity priority 162, which may again be a numeric indication, according to a pre-determined scale, that indicates a priority associated with the issue data based primarily on an identified issue type to which the issue data 150 pertains. For example, a technical issue that may cause a catastrophic failure within a system (e.g., the marketplace 12) will be accorded a higher severity priority 162 than will an issue that may only cause a minor degradation in performance of a system. In another example, where the reported issue is identified being an attempt to transact a banned or illegal item, the severity priority 162 may be higher than a severity priority 162 attributed to an issue which is only a minor transgression of rules pertaining to a system (e.g., transaction rules pertaining to the marketplace 12).

Figure 8:
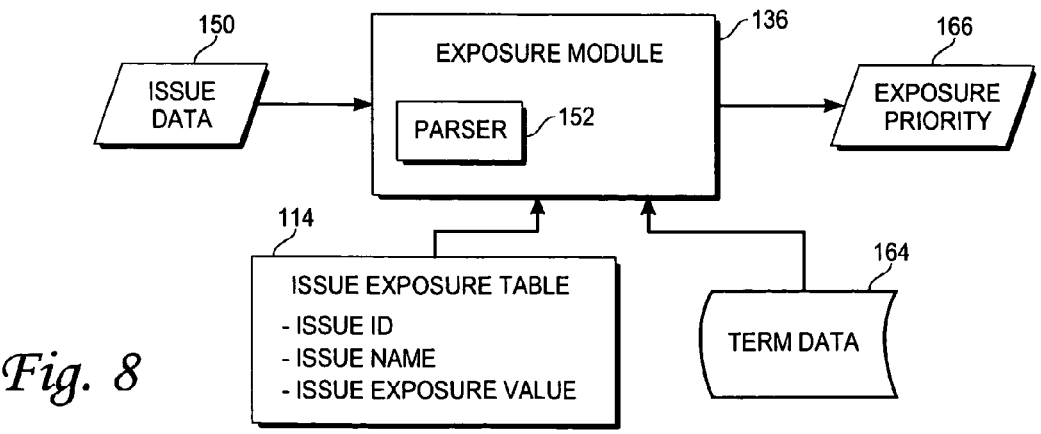
FIG. 8 is a block diagram providing for the details regarding the exposure module, which, according to one exemplary embodiment of the present invention, receives the issue data as an input, and outputs an exposure priority that is indicative of a potential loss or liability.

FIG. 8 is a block diagram providing for the details regarding the exposure module 136 which, according to one exemplary embodiment of the present invention, receives the issue data 150 as an input, and outputs an exposure priority 166 that is indicative of a potential loss or liability either to an operator of a system (e.g., the operator of the marketplace 12) or some other entity associated with the system (e.g., a seller or buyer that is transacting via the marketplace 12). The exposure priority 166 may again be a numerical value defined according to a pre-determined exposure scale. In order to assess an exposure associated with a particular issue data 150, the exposure module 136 is again shown to include a parser 152 that parses received issue data. Utilizing the parsed issue data, a look up is performed on an issue exposure table 114 to retrieve an issue exposure value that may be associated with a particular issue, or entity. As with the severity module 134, the exposure module 136 may receive term data 164 as input, which may be utilized by the exposure module 136 in identifying a particular issue, or other attributes associated with an issue and useful to perform a look up in the issue exposure table 114.

Figure 9:
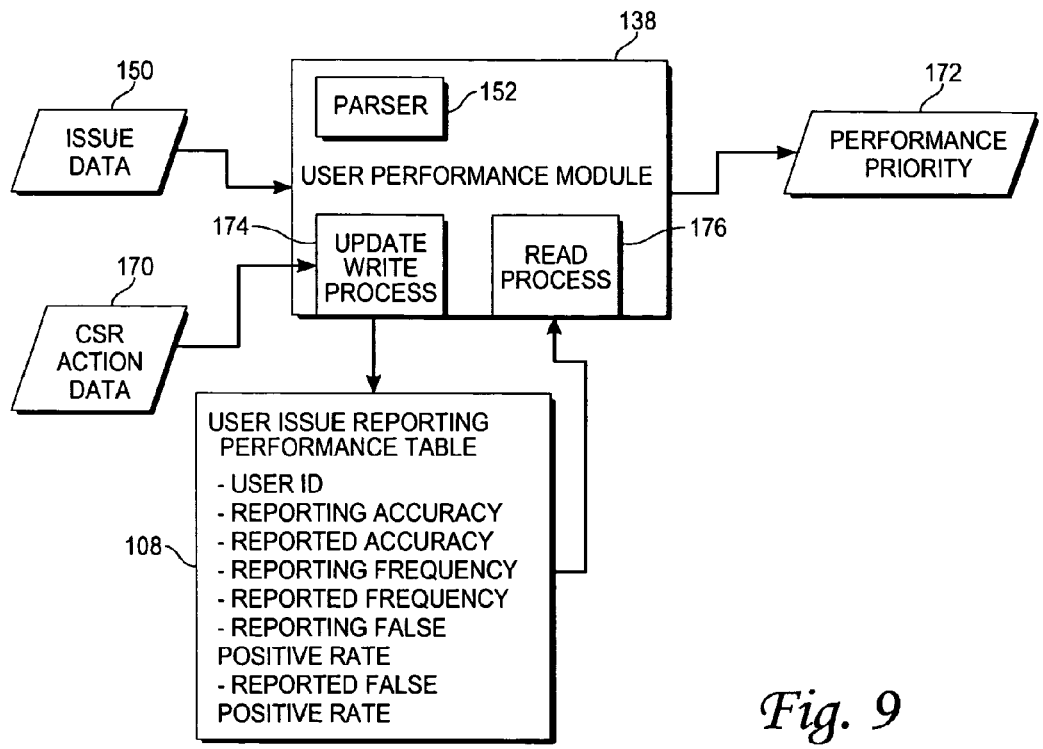
FIG. 9 is a block diagram providing further details regarding a user performance module, according to an exemplary embodiment of the present invention.

FIG. 9 is a block diagram providing further details regarding the user performance module 138, according to an exemplary embodiment of the present invention. The user performance module 138 is shown to receive issue data 150 and customer service representative action data 170 as inputs. A parser 152 operates, as described above, to deconstruct the issue data 150 into units that are meaningful. The user performance module 138 operates to output a performance priority 172, in the exemplary form of a performance priority value indicative of a prioritization of the issue data, against a predetermined scale, based at least partially on the past performance of a reporting entity in reporting issues pertaining to a system (e.g., the marketplace 12). For example, if the performance data indicates that in the past, a particular reporting entity has been highly reliable and accurate in reporting issues pertaining to a system, the user performance module 138 will operate to assign a relatively higher performance priority 172 to the issue data 150. To this end, the user performance module 138 includes a read process 176 that, utilizing a user identifier identifying a reporting entity, performs a look up in the user issue reporting performance table 108 to retrieve performance data regarding the reporting entity. For example, as illustrated in FIG. 9, the user issue reporting performance table 108 may include information reflecting past reporting accuracy, reporting frequency, reported frequency, a reporting false positive rate, and a reported false positive rate for an entity.

It will be appreciated that the performance priority 172, in addition to being based upon a past performance of a reporting entity, may also be influenced by the past history of a reported entity (e.g., a user of the marketplace 12 that is accused of a violation). For example, consider that where the issue data 150 identifies a particular user as being a potentially violating user, the read process 176 may retrieve a historical reported false positive rate from the table 108. A relatively high false positive rate may indicate that the relevant user has been previously reported in connection with an issue, but that these issues have been assessed as false. In this case, the user performance module 138 may attribute a lower performance priority 172. In summary, the user performance module 138 may factor in both the past performance of a reporting entity, and a reported entity when calculating the performance priority 172. The module 138 can also attribute different weights to information concerning the reporting entity and the reported entity. For example, a higher weighting may be attributed to the past performance of the reporting entity.

The user performance module 138 is also shown to include an update write process 174 that, based on a response activity, updates information within the user issue reporting performance table 108. For example, where a particular issue is assessed as being a false positive, records within the table 108 for both a reporting entity and a reported entity may be updated to indicate this outcome. Alternatively, where the issue is found to in fact exist, the appropriate records within table 108 may be similarly updated. In one embodiment, the update write process 174 may determine the response activity from the customer service representative action data 170, which indicates what activities the customer service representative performed responsive to the issue data. For example within the context of the marketplace 12, where a customer service representative de-listed a particular item for sale in the marketplace 12, the action data 170 may reflect this situation, which is then utilized by the update write process 174.

Figure 10:
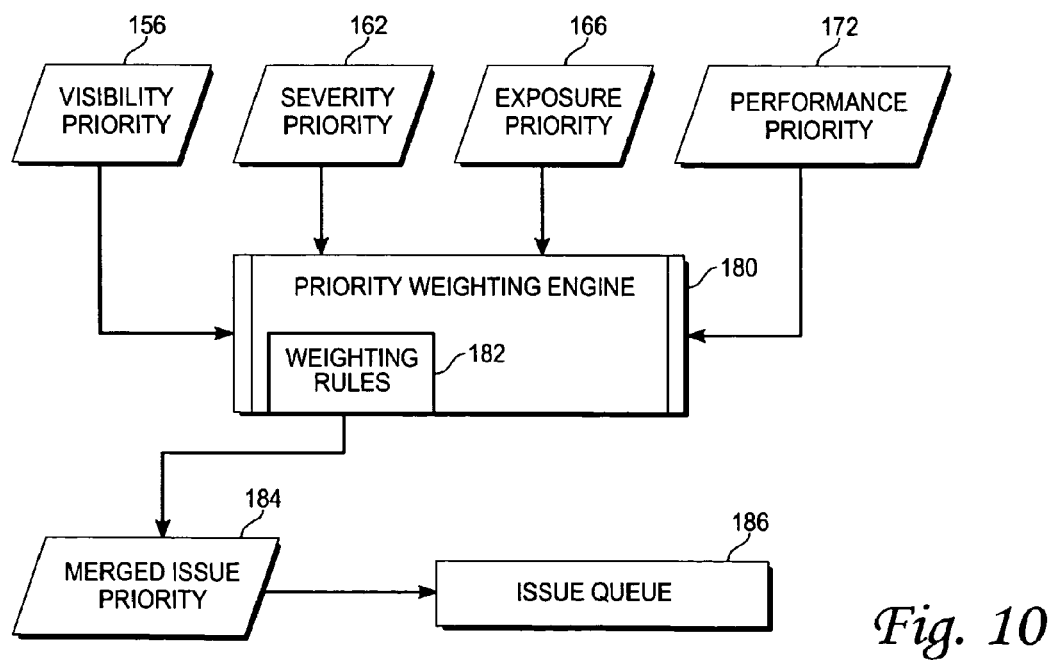
FIG. 10 is a block diagram illustrating a priority-weighting engine, according to an exemplary embodiment of the present invention, which operates to generate a merged issue priority.

FIG. 10 is a block diagram illustrating a priority weighting engine 180, according to an exemplary embodiment of the present invention, that operates to merge the visibility priority 156, the severity priority 162, the exposure priority 166, and the performance priority 172 into a merged issue priority, which is associated with reconciled and integrated issue data written into a issue queue 186 for appropriate response activity. To this end, the priority weighting engine 180 is shown to receive each of the priorities 156, 162, 166, and 172 as input, and then to apply one or more weighting rules 182 to the received priorities in order to generate the merged issue priority 184. The weighting rules 182 may be static (e.g., visibility priority 156 may always be more heavily weighted than the other priorities), or may be dynamic. For example, the priority weighting between the various priorities may be modified dynamically in accordance with the time of day, or other factors that are dynamically determined.

Figure 11:
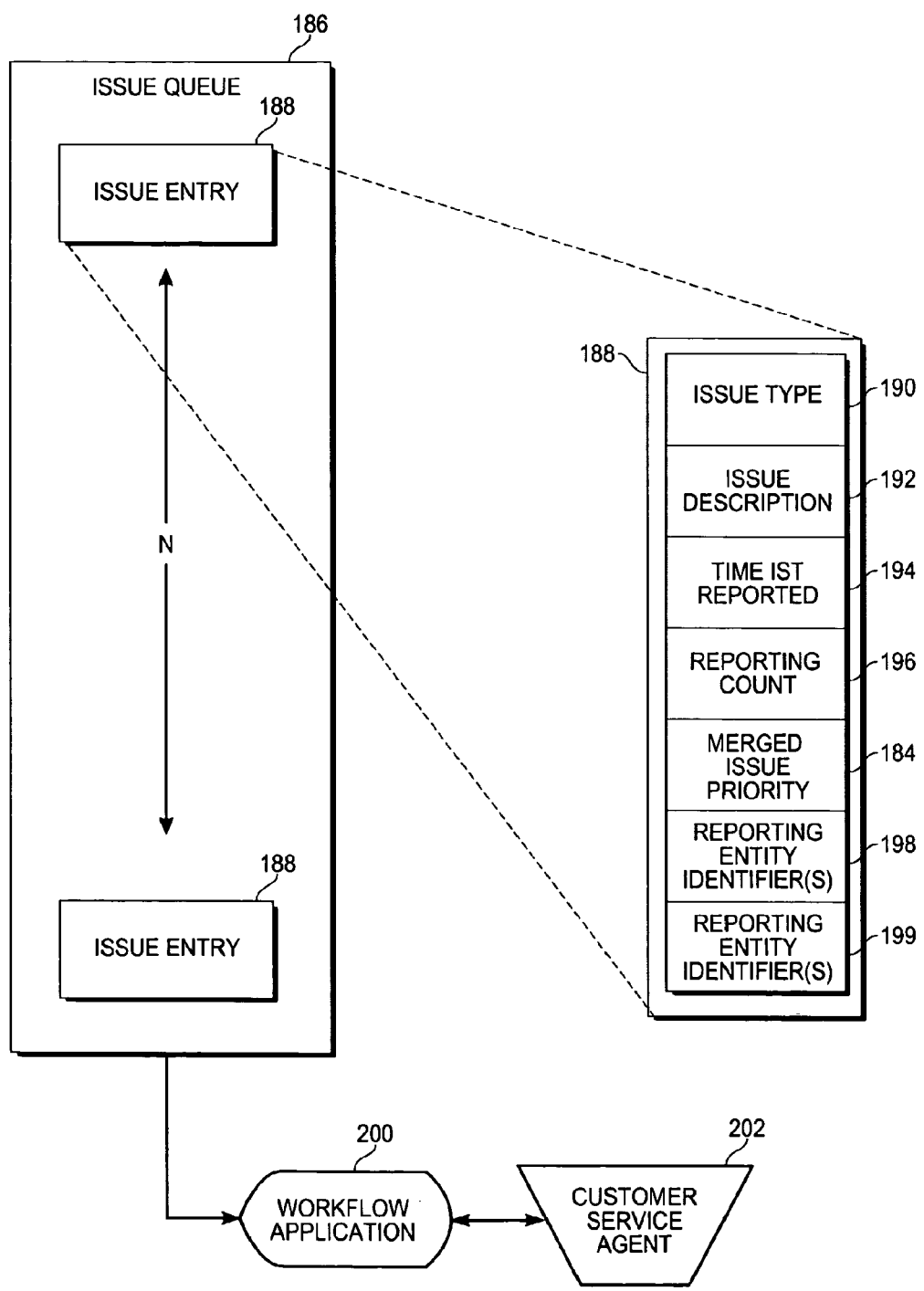
FIG. 11 is a block diagram illustrating details regarding a issue queue 186, according to an exemplary embodiment of the present invention, which is shown to be populated with issue entries.

FIG. 11 is a block diagram illustrating further details regarding the issue queue 186, according to an exemplary embodiment of the present invention, which is shown to be populated with issue entries 188. Each issue entry 188 is, as described with reference to FIG. 5, written into the issue queue 186 by the issue correlation and prioritization engine 128, which correlates, aggregates and prioritizes issue data 122 and 126. Accordingly, a single issue entry 188 within the queue 186 may represent the aggregation of a number of sets of issue data (e.g., issue reports) received at the issue correlation and prioritization engine 128. Each issue entry 188 is further shown to include issue type information 190, an issue description 192, a time at which the issue was first reported 194, a reporting count 196 (e.g., the number of unique sets of issue data that had been received reporting the relevant issue), and the merged issue priority 184.

Each issue entry 188 is also shown to include one or more reporting entity identifiers 198 and one or more reported entity identifiers 199. As each issue entry 188 may represent an aggregation of a number of sets of issue data received from any number of reporting entities, and concerning any number of reported entities, it is useful to track each of the multiple entities that may be associated with a single issue entry 188. For example, the assessment of whether the issue is valid or not is utilized to update history information regarding both reporting and reported entities. By tracking multiple reporting and reported entity identifiers for each issue entry 188, the user performance module 138 is enabled to update records for the appropriate entities within the user issue reporting performance table 108.

Issue entries 188 from the issue queue 186 are dispensed for response activity, for example to a customer service agent 202, by a workflow application 200 according to the merged issue priority 184. Where a number of issue entries 188 within the issue queue 186 have the same merged issue priority 184, the workflow application 200 may then examine the time 194 at which the issue was first reported to determine which issue entry is to receive response activity when appropriate resources (e.g., an agent) becomes available.

Figure 12:
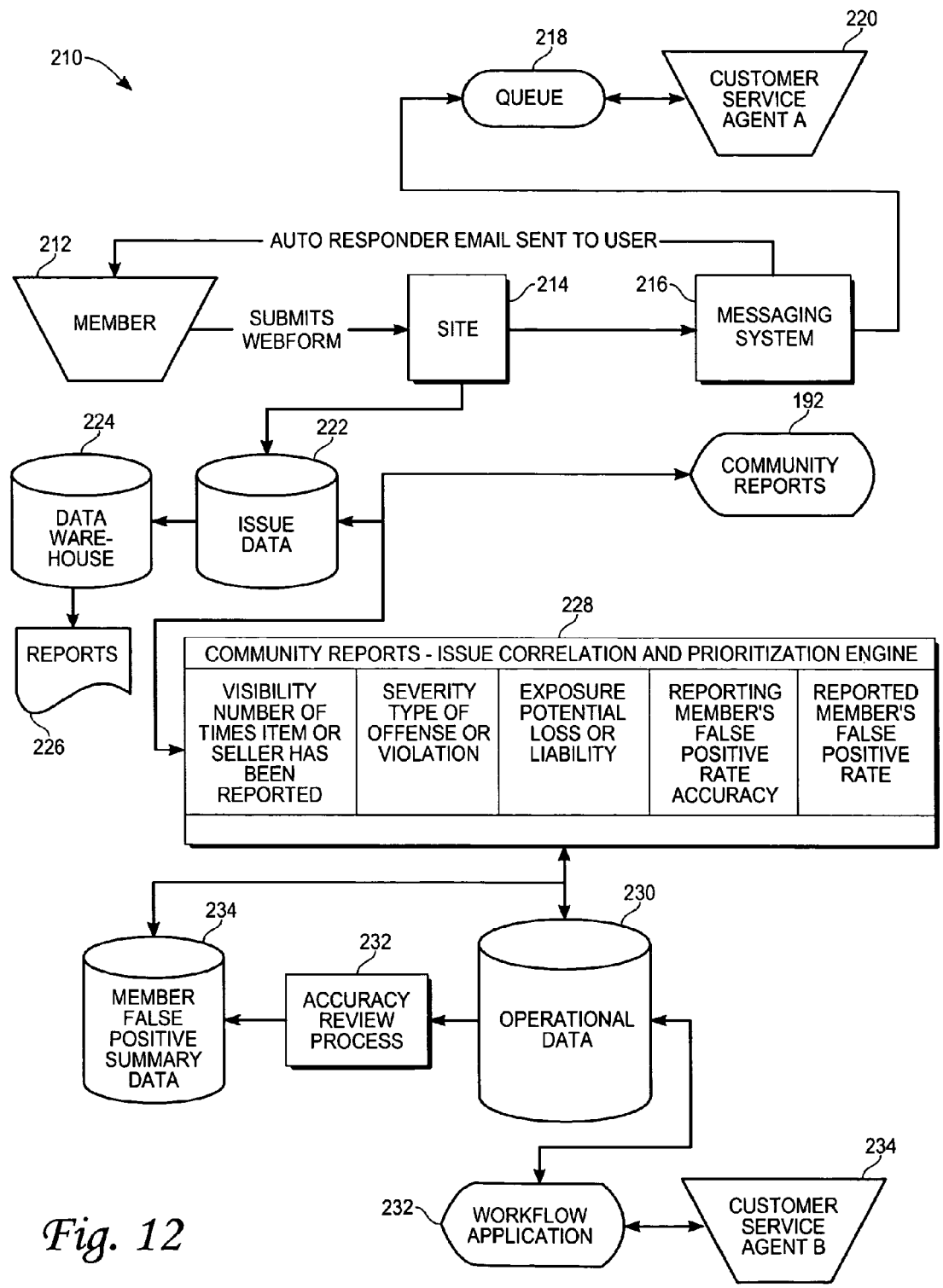
FIG. 12 is a schematic diagram illustrating an exemplary deployment of an issue processing system, in conjunction with a website, which may for example support a network-based marketplace.

FIG. 12 is a schematic diagram illustrating an exemplary deployment of an issue processing system 210, in conjunction with a website 214, which may for example support a network-based marketplace 12. A user 212 of the marketplace 12 submits issue data 122, utilizing for example an HTML form, to the marketplace website 214, from where the issue data 122 is communicated to a messaging system 216. The messaging system 216 may communicate the issue data 122 to a queue 218, serviced by a customer service agent 220, in the event that the issue is of a specific type. The messaging system 216 also provides an auto-response e-mail back to the user 212. The website 214 then also communicates the issue data 122 to a data warehouse 224, from which various reports 226 may be generated. The issue data 122 is also communicated from the website 214 to an exemplary issue correlation and prioritization engine 228, from where the correlated and prioritized issue data (conveniently termed operational data 230) is provided to an accuracy review process 232. Thereafter, the relevant user's performance and history data is updated and summarized at 234. The operational data 230 may furthermore be accessed (e.g., from an issue queue) by a workflow application 232, and provided to a customer service agent 234, for appropriate response activity, utilizing priority data associated with the operational data 230.

Figure 13:
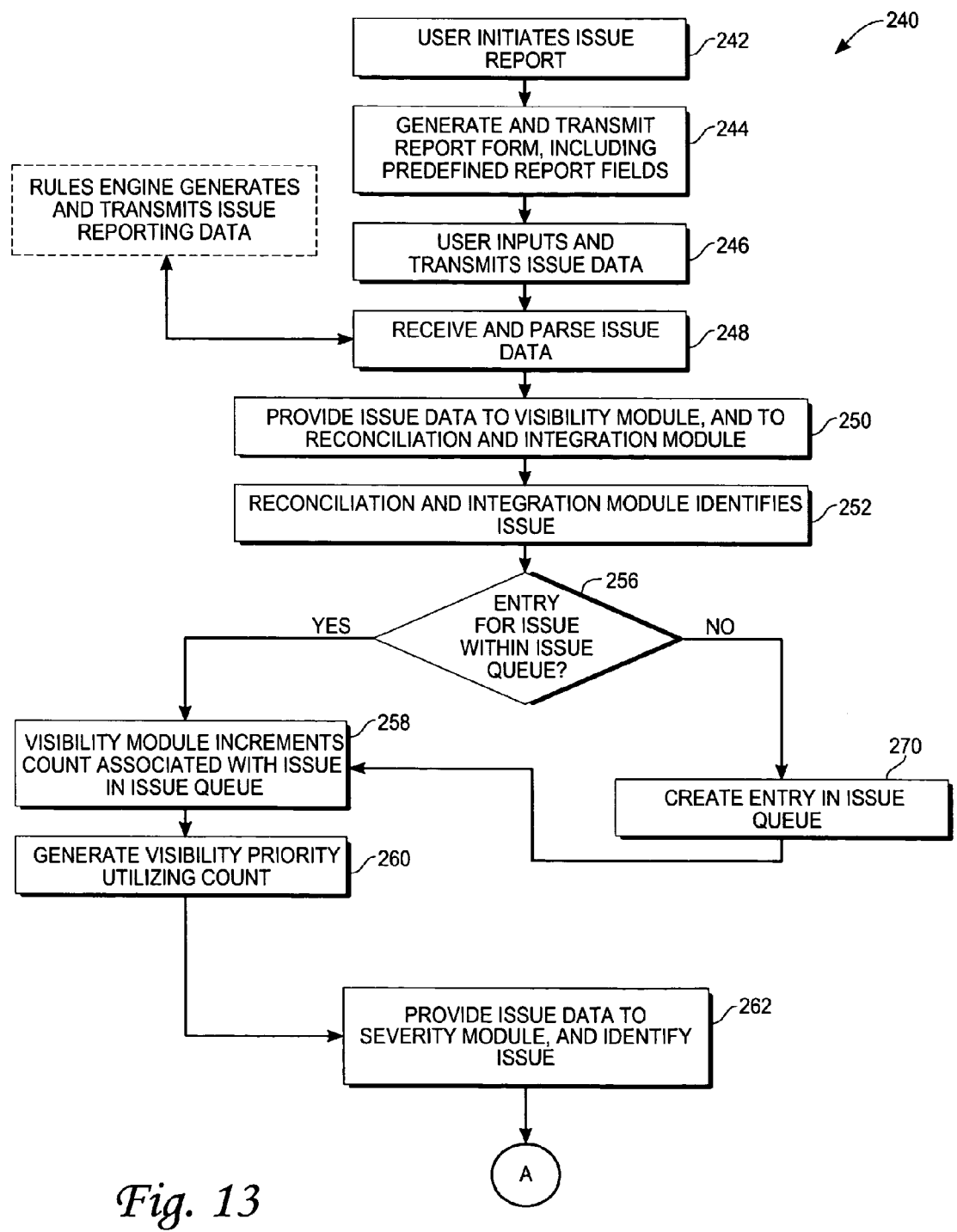
FIGS. 13 and 14 present flowchart depicting a computer-implemented method, according to an exemplary embodiment of the present invention, to process issue data, pertaining to a system.

FIG. 13 is a flowchart depicting a computer-implemented method 240, according to an exemplary embodiment of the present invention, to process issue data, pertaining to a system. The exemplary method 240 is discussed below in the context of issue reporting in connection with network-based marketplace 12.

Figure 16:
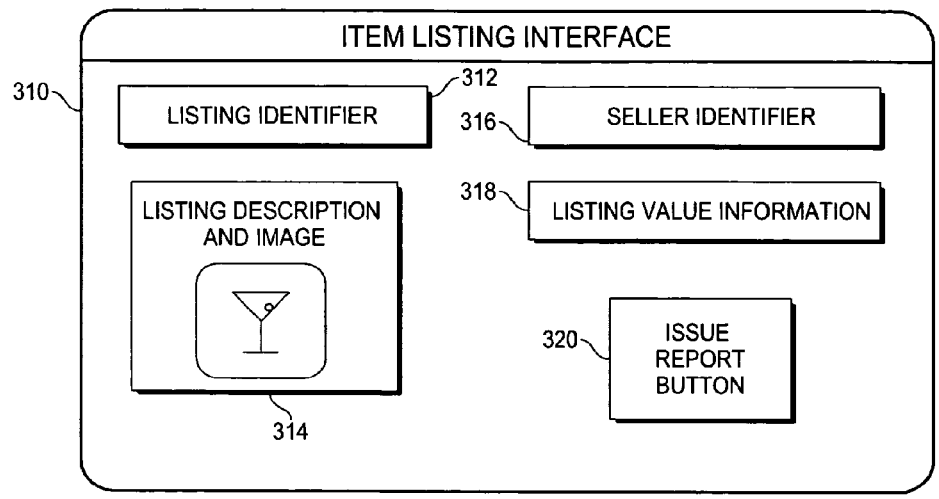
FIG. 16 illustrates an example of an interface that may be presented to a user of the network-based marketplace, in the form of an item-listing interface.

The method 240 commences at block 242, with the issuance, by a user 120 or an automated agent (e.g., the rules engine 124) of issue data, in the exemplary form of an issue report. Considering a specific example where a human user initiates the issue reporting, an interface may be presented to the user so as to allow the user conveniently to commence the issue reporting process. FIG. 16 illustrates an example of such an interface that may be presented to a user of the network-based marketplace 12, in the form of an item listing interface 310. In one embodiment of the item listing interface 310 is an HTML document that is communicated from a web server 26 of the networkbased marketplace 12 to a client machine 20 of the user for display by a web client 16. The item listing interface 310 is shown to include a listing identifier 312 (e.g., an item code), a listing description and image 314, a seller identifier 316 (e.g., an e-mail address, handle, alias, etc.), and listing value information 318 (e.g., a dollar amount). The interface 310 also includes an issue report mechanism, in the exemplary form of an issue report button 320, which is user selectable to initiate an issue report. In one embodiment of the present invention, the issue report button 320 may be included with in the interface 310 only as presented to certain users. For example, certain users of the network-based marketplace 12 may be registered participants within an issue-reporting program. When such registered users access the networkbased marketplace 12, the relevant users will be recognized as registered participants within the issue-reporting program, and interfaces, such as the item listing interface 310, may be customized accordingly. In another exemplary embodiment of the present invention, the item listing interface 310 may be customized according to the performance data regarding the relevant user, as reflected in the user issue reporting performance table 108. Specifically, the issue report button 320 may be incorporated within the interface 310 only if the information for the relevant user, as contained within the table 108, satisfies predetermined criteria or exceeds a predetermined threshold. For example, a web server 26 may selectively include the issue report button 320, based on a user's recorded reporting accuracy, or number of false positives, as reflected in the table 108.

Figure 17:
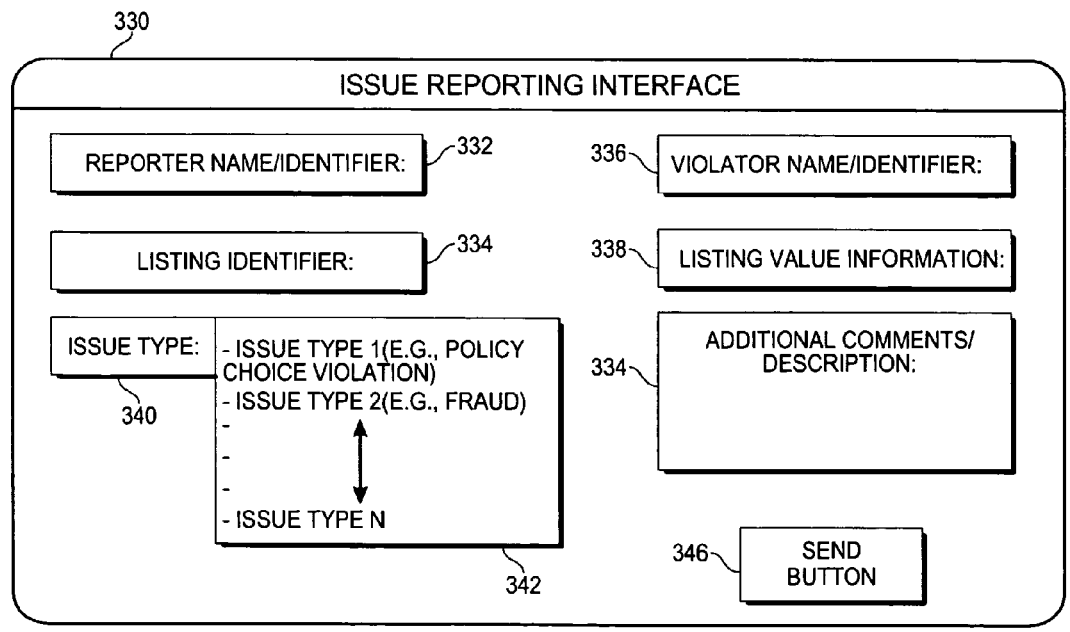
FIG. 17 illustrates an exemplary issue-reporting interface, in the form of an HTML document, according to one embodiment of the present invention.

Returning to FIG. 13, at block 244, the network-based marketplace 12 generates and transmits a report form, including predefined report fields, to the client machine 20. FIG. 17 illustrates an exemplary issue reporting interface 330, in the form of an HTML document, which may be generated and transmitted at block 244, in one embodiment of the present invention. The issue reporting interface 330 is shown to include a reporter (or reporting) entity name or identifier input field 332, a listing identifier input field 334, an optional reported entity name identifier input field 336, a listing value information input field 338, and an issue type input field 340. A drop down menu 342, which presents a predetermined set of issue type identifiers, may be presented to assist the reporting entity to provide appropriate issue type information. The contents of the dropdown menu 342 may, for example, be extracted from the issue table 116, illustrated in FIG. 4. Finally, the issue reporting interface 330 may include an additional comment/description input field 344, into which the reporting entity may provide additional comments and description pertaining to the reported issue. A send button 346 is user selectable to cause communication of information inputted into the various input fields of the interface 330 to be communicated from the client machine 20 to the server side (e.g., to the network-based marketplace 12).

Returning again to FIG. 13, at block 246, the user inputs appropriate information into the report form (e.g., the issue reporting interface 330), and transmits the issue reporting issue data (e.g., by selection of the send button 346).

It will be appreciated that where the issue data is generated by an automated agent, such as for example the rules engine 124, the automated agent may execute one or more issue detection algorithms and monitor various parameters applicable to the monitored system. These operations may include comparing monitored parameters against predetermined rules and, based on an analysis of the monitored parameters potentially generating issue data, and communicating this issue data to the server side.

At block 248, the issue correlation and prioritization engine 128, as described above with reference to FIG. 5, receives the issue data (e.g., the user-generated issue data 122 or the rule-generated issue data 126), and parses this issue data. While each of the modules 132-138 is described herein as having a dedicated parser, the issue correlation and prioritization engine 128 may deploy a single parser that parses received issue data prior to further processing.

At block 250, the issue data is communicated to the visibility module 132 and to the reconciliation and integration module 130. At block 252, the reconciliation and integration module 130, having received the parsed issue data, employs logic to identify an issue to which the issue data pertains. This operation may simply involve identifying an issue type from issue type information included within the issue data or, in other embodiments, may involve the utilization of sophisticated algorithms that analyze the issue data. The operations performed at block 252 seek to identify an issue so that the reconciliation and integration module 130 can determine whether an issue entry 188, pertaining to the relevant issue, already exists within the issue queue 186, thereby allowing the reconciliation and integration module 130 to reconcile and aggregate issue data received at different times and from multiple sources potentially reporting a common issue. This aggregation is advantageous in that it has the effect of reducing the number of discreet entries within an issue queue 186 that require attention of, for example, a customer service agent 202 or some other analyzing entity or service.

At decision block 256, the reconciliation and integration module 130, having identified the relevant issue at block 252, determines whether an issue entry 188 for the identified issue exists within the issue queue 186. If not, the method 240 progresses to block 270, and the module 130 creates an issue entry 188 for the newly identified issue within the issue queue 186.

On the other hand, in the event that an issue entry 188 already exists within the issue queue 186, the visibility module 132, at block 258, increments the reporting count 196 for the relevant issue entry 188, and then, at block 260, generates the visibility priority 156 for the relevant issue, based on the newly received issue data 150.

At block 262, the issue data is then provided to the exposure module 136, which is described above, to the severity module 134 that then identifies the issue, for example using the issue identification information generated by the reconciliation and integration module at block 252.

Figure 14:
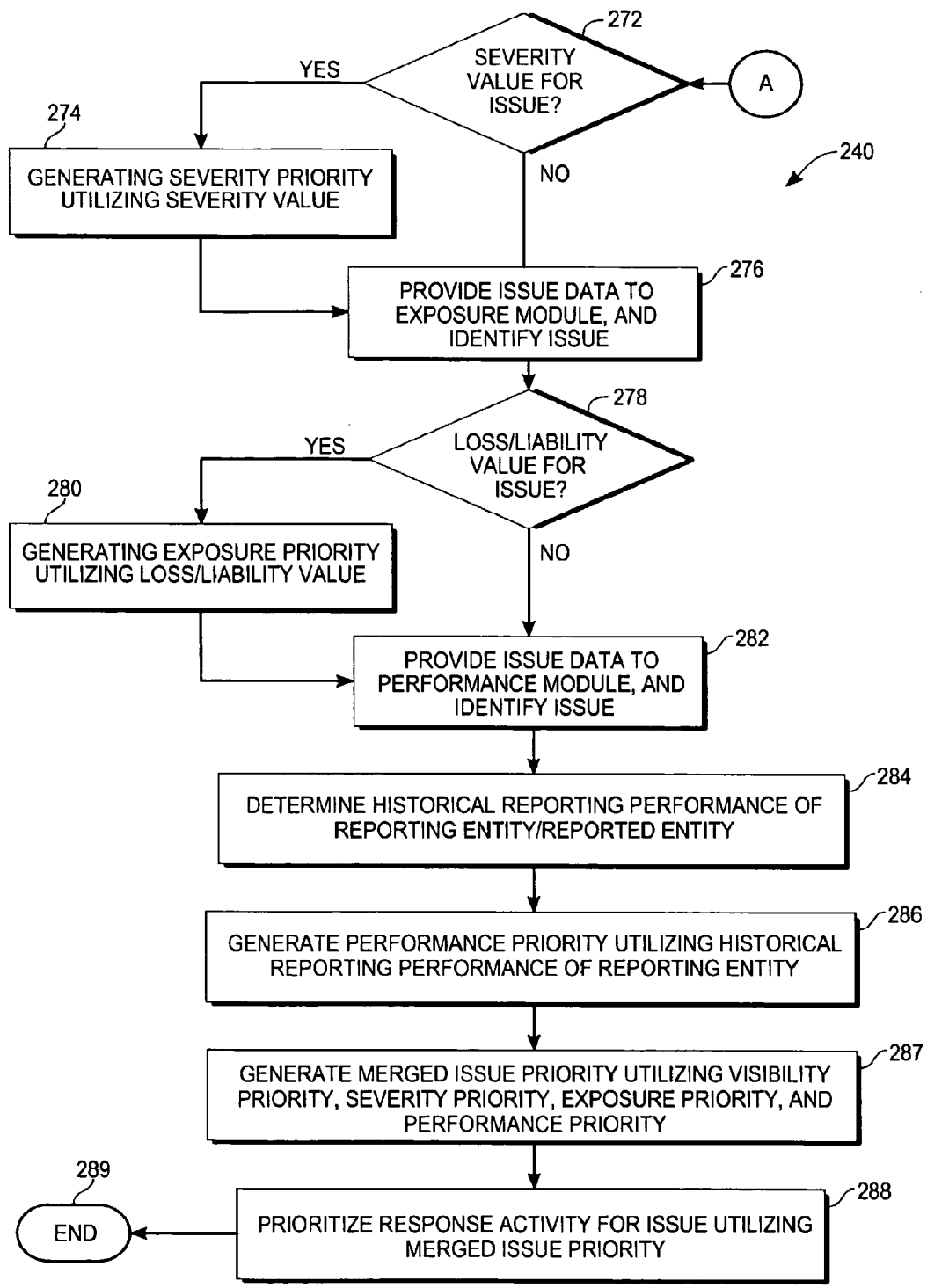

The description of the exemplary method 240 continues in FIG. 14. Specifically at decision block 272, the severity module 134 determines whether an issue severity value is stored within the issue severity table 112 for the identified issue. If so, at block 274, the severity module 134 generates the severity priority 162 utilizing this severity value. In the absence of a record for the identified issue within the issue severity table 112, the severity module 134 may, nonetheless, generate a severity priority 162 for the relevant issue based on, for example, an analysis of terminology included within the issue data, utilizing the term data 160 which is shown in FIG. 7 to be available to the severity module 134.

Moving on to block 276, the issue data is then provided to the exposure module 136, which again identifies the issue to which the issue data 150 pertains. At decision block 278, a determination is made as to whether an issue exposure value is present in the issue exposure table 114 for the identified issue. If so, the method 240 progresses to block 280, where the exposure module 136 generates the exposure priority 166 utilizing the retrieved issue exposure value. Again, in the absence of an appropriate record in the issue exposure table 114 for the identified issue, the exposure module 136 may also employ various algorithms to analyze the terminology and other attributes of the issue data 150, for example utilizing the term data 164, to generate an exposure priority 166 to be associated with the issue data 150.

At block 282, the issue data is communicated to the user performance module 138. At block 284, the user performance module 138 determines an historical reporting performance of the reporting entity (e.g., the reporting user 120); For example, this determination may be performed by accessing the user issue reporting performance table 108, as described above with reference to FIG. 9. As also previously described, at block 284, the user performance module 138 may also determine the historical accuracy of reported information concerning the reported entity (e.g., a reported violating user) based on an appropriate record within the user issue reporting performance table 108.

At block 286, the user performance module 138 then generates the performance priority 172, based on the historical reporting performance of the reporting user and/or the historical reported information concerning the reported user (or entity).

Moving on to block 287, the various priorities 156, 162, 166 and 172 are communicated from the respective modules to the priority weighting engine 180, which applies the weighting rules 182 to generate the merged issue priority 184. The merged issue priority 184 is then written to the appropriate issue entry 188, within the issue queue 186.

At block 288, at least one response activity is prioritized for the issue utilizing the merged issue priority 184. For example, the workflow application 200 illustrated in FIG. 11 may allocate the issue entry 88 to a customer service agent 202 according to the merged priority, the customer service agent 202 then taking the appropriate response activity, if warranted. For example, where the reported issue is the listing of an illegal item for sale via the network-based marketplace 12, the customer service agent may cause the offending item to be de-listed. Further, the customer service agent may notify the appropriate authorities regarding the issue.

Where the issue is of a technical nature, the issue may be allocated by the workflow application 200 to a technical specialist, who will then take the appropriate steps to resolve the technical issue.

The method 240 provides the advantage of having the merged issue priority 184 calculated utilizing the performance priority 172, inter alia. This has the effect of allowing the historical accuracy (or other performance metrics) associated with a reporting entity (e.g., a human reporting user) to be factored into the prioritization of response activities to an issue. It will furthermore be appreciated that while the calculation of the various priorities by the respective priority modules has been described above as being performed in a serial fashion, these prioritization activities could be performed in parallel. Further, the various priorities described above need of course not all be performed and, in various embodiments, only one or more of these prioritization activities may be deployed.

Figure 15:
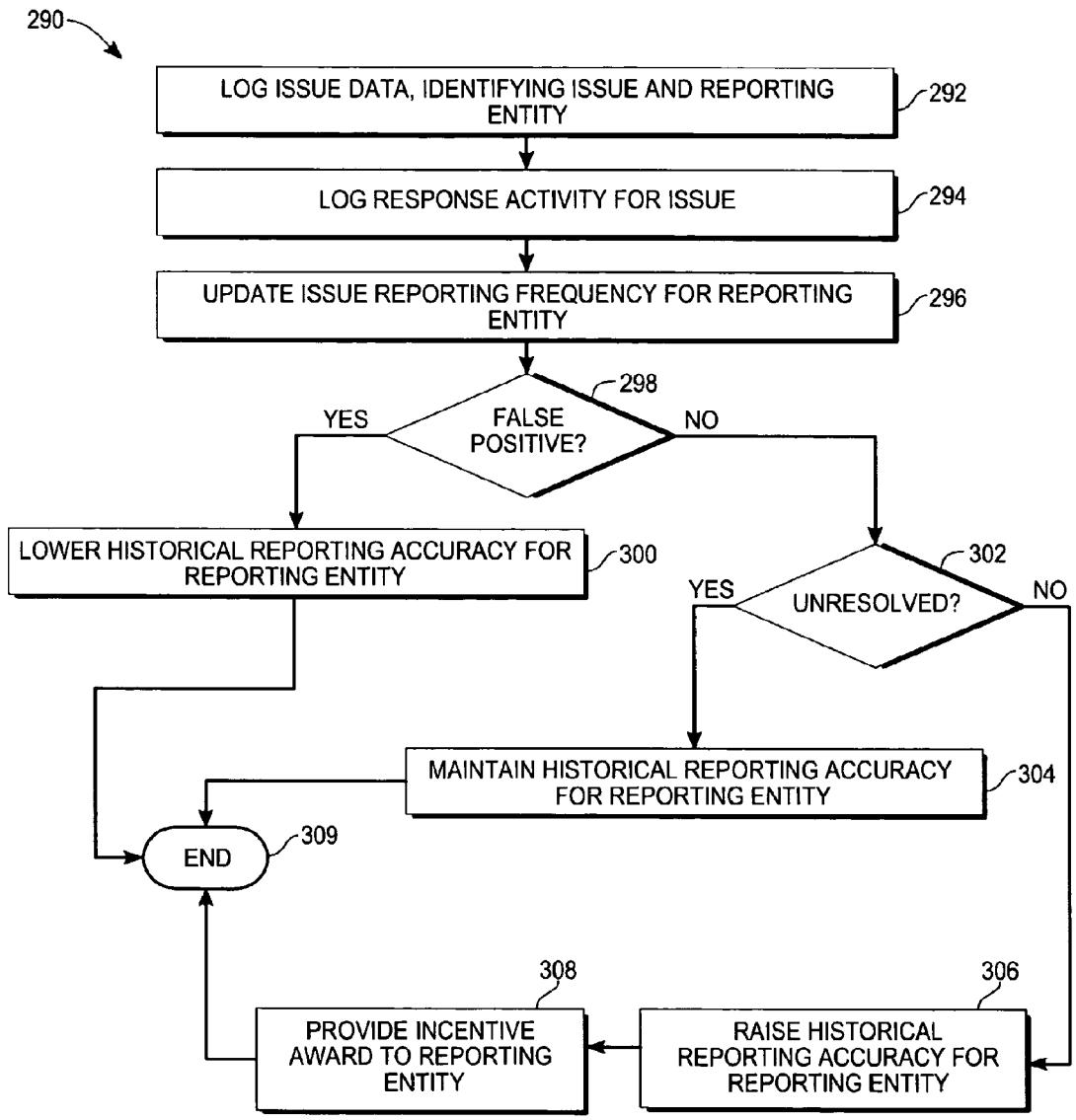
FIG. 15 is a flowchart illustrating a method, according to an exemplary embodiment of the present invention, to update information reflecting the historical reporting accuracy of a reporting entity, or to update the historical information regarding reporting concerning a reported entity.

FIG. 15 is a flowchart illustrating a method 290, according to an exemplary embodiment of the present invention, to update information reflecting the historical reporting accuracy of a reporting entity, or to update the historical information regarding reporting concerning a reported entity (e.g., a reported user). The method 290 commences at block 292, with the logging by the issue correlation and prioritization engine 128 of the issue data 150, identifying the appropriate issue, as well as the reporting entity and the reported entity.

At block 294, the issue correlation and prioritization engine 128 logs a response activity (or the absence of a response activity) that may have been performed pertinent to the relevant issue. To this end, FIG. 5 illustrates that a customer service representative action 142 may be communicated back to the user performance module 138. For example, where a customer service representative de-lists a violating item from the network-based marketplace 12, this de-listing may be logged by the user performance module 138 as the appropriate response activity for the issue. Similarly, where the reported issue relates to a listing, and the listing is retained following a customer service review, this retention of the listing within the network-based marketplace 12 may also be logged as a response activity or, in this particular case, the absence of a response activity (i.e., the absence of a de-listing).

At block 296, the issue reporting frequency for the reporting entity and/or the reported entity is updated by the user performance module 138 within the table 108.

At block 298, the user performance module 138, based on the logged response activity, determines whether the reporting of the issue generated a false positive. Specifically, this may involve determining whether the reported issue was, in fact, a valid issue, or whether the accuracy and/or validity of the issue reported is in doubt. In the event that a false positive is detected at decision block 298, the method 290 progresses to block 300, where the user performance module 138 lowers the historical reporting accuracy for the reporting user. Further, the user performance module 138 may modify the reporting and reported frequency for both the reporting and the reported entity, and also update the reported false positive rate for the reported entity.

On the other hand, in the absence of a false positive at decision block 298, a determination is then made at decision block 302 whether the validity and/or accuracy of the reported issue is unresolved. If so, the method progresses to block 304, and the reported and reporting accuracy is maintained for the relevant entities within the table 108. However, the reporting and reported frequency for each of the entities may be incremented as a result of receipt of the relevant issue data 150.

Following a negative determination at decision block 302 (this indicating a true positive—i.e., that the issue reported was in fact accurately reported and is a valid issue), at block 306 the historical reporting accuracy for the reported user is incremented, and the reported and reporting frequencies for the appropriate entities is also updated within the table 108.

At block 308, an incentive award may be provided to the reporting entity. Specifically, the incentive award may be provided on the basis of provision of specific issue data 150 that is assessed to be valid and/or accurate. Alternatively, the incentive award may be provided to the reporting entity on the basis of the historical reporting accuracy and/or the reporting frequency for the reporting entity exceeding predetermined award thresholds.

In yet a further embodiment of the present invention, the inverse may also be applied in that a disincentive may be provided to a reported entity. Where the reported frequency associated with a reported entity exceeds a threshold, certain disincentive actions may be taken against the reported entity. For example, where the reported entity is a user of the network-based marketplace 12 that has received issue reports with a predetermined frequency, and these issue reports are assessed to be valid, trading privileges for the reported entity within the marketplace 12 may be revoked.

Alternatively, the reported entity may be sent an automated warning regarding issues that were reported to the issue correlation and prioritization engine 128, and advised to cease such activities or face punitive consequences The method 290 then terminates at block 309.

Figure 18:
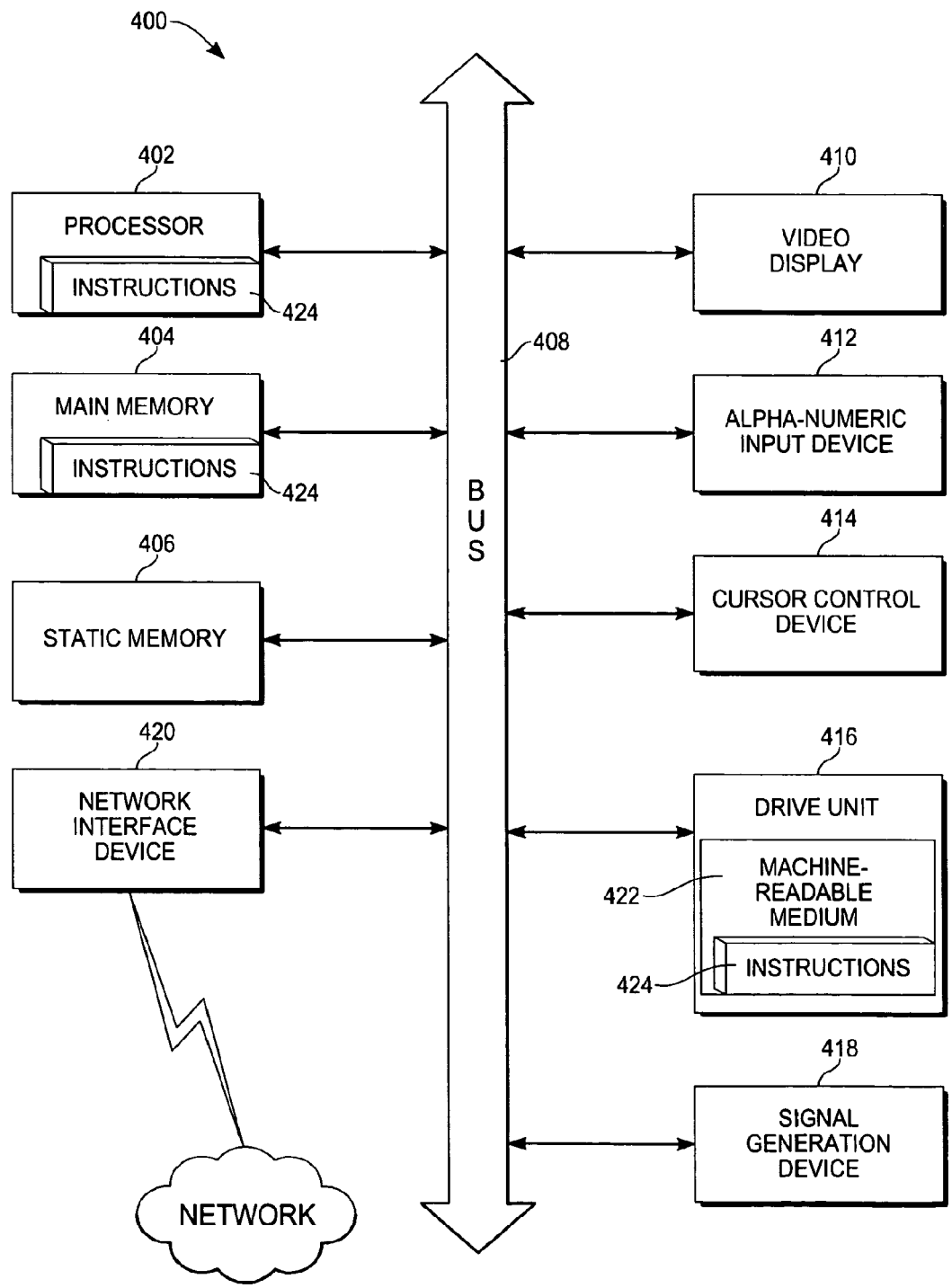
FIG. 18 shows a diagrammatic representation of machine in the exemplary form of a computer system within which a set of instructions, for causing the machine to perform any one or more of the methodologies discussed herein, may be executed.

FIG. 18 shows a diagrammatic representation of machine in the exemplary form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 492 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to process issue reports pertaining to a system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
one or more hardware processors of a machine configure to at least:
monitor a computing network for a violation of a parameter defined by rules, the violation reported in an issue report categorized by a predefined issue type;
identify an issue type and location identifying information where an issue of the issue report occurs;
perform a look up for an exposure value from an issue exposure table stored in one or more networked databases, the exposure value determined based on data parsed from the issue;
perform a look up for a severity value from an issue severity table stored in the one or more networked databases, the severity value based on an issue type of the issue, the severity table comprising records that include a predetermined severity level for each existing issue type;
generate a merged issue priority for the issue by merging a plurality of different priority types, the plurality of different priority types including an exposure priority indicating a potential loss or liability and a severity priority, the exposure priority being based on the exposure value and the severity value, the merged issue priority used to automatically prioritize the issue; and
a workflow application to determine a predefined response activity for responding to the issue and triggering an action based on the predefined response activity,
the one or more hardware processors further to log the issue and the response activity.

2. The system of claim 1, wherein the one or more hardware processors are further to determine whether the issue corresponds to existing issue entries in an issue queue, and to reconcile and aggregate issue data for the issue report with corresponding existing issue entries in the issue queue resulting in a reduced number of discreet entries in the issue queue.

3. The system of claim 1, wherein the predefined response activity in performed in an automated manner.

4. The system of claim 1, wherein the workflow application is to further provide a notification to a user that includes the identified issue description.

5. The system of claim 1, wherein the one or more hardware processors are further to access historical data associated with the issue report.

6. The system of claim 1, wherein the one or more hardware processors generates the merged issue priority by applying at least one weighting rule to the different priority types.

7. The system of claim 1, wherein the one or more hardware processors are to determine a visibility priority based on a count of a number of times a specific issue is reported, the visibility priority being one of the plurality of different priority types, the visibility priority providing an assessment of the number of times a specific issue has been reported, the merged issue priority including the visibility priority, the exposure priority, and the severity priority.

8. The system of claim 1, wherein the one or more hardware processors are further to:
parse the issue to obtain priority criterion data relating to at least one priority criterion which is unrelated to respective dates or times of the reported issue; automatically prioritize the issue by applying to the issue the issue priority based at least partially on the associated priority criterion data; and
communicate the issue to an agent based on the issue priority.

9. A method comprising:
monitoring a computing network for a violation of a parameter defined by rules, the violation reported in an issue report categorized by a predefined issue type;
identifying, using a hardware processor of a machine, an issue type and location identifying information where an issue of the issue report occurs;

performing a look up for an exposure value from an issue exposure table stored in one or more networked databases, the exposure value determined based on data parsed from the issue;

performing a look up for a severity value from an issue severity table stored in the one or more networked databases, the severity value based on an issue type of the issue, the severity table comprising records that include a predetermined severity level for each existing issue type;

generating a merged issue priority for the issue of by merging a plurality of different priority types, the plurality different priority types including an exposure priority indicating a potential loss or liability and a severity priority, the exposure priority being based on the exposure value and the severity value, the merged issue priority used to automatically prioritize the issue;

determining a predefined response activity for responding to the issue; triggering an action based on the predefined response activity; and logging the issue and the response activity.

10. The method of claim 9, further comprising defining an issue category tree having increasing levels of granularity, the issue being categorized using the issue category tree, the issue category tree differentiating issue types based in part on a subject matter of a specific transaction to which the issue pertains.

11. The method of claim 9, further comprising:
determining whether the issue corresponds to existing issue entries in an issue queue; and
reconciling and aggregating issue data for the issue report with corresponding existing issue entries in the issue queue resulting in a reduced number of discreet entries in the issue queue.

12. The method of claim 9, further comprising providing a notification to a user that includes the identified issue description.

13. The method of claim 9, further comprising accessing historical data associated with the issue report.

14. The method of claim 9, wherein generating the merged issue priority comprises further comprising applying at least one weighting rule to the different priority types.

15. The method of claim 9, further comprising determining a visibility priority based on a count of a number of times a specific issue is reported, the visibility priority being one of the plurality of different priority types, the visibility priority providing an assessment of the number of times a specific issue has been reported, the merged issue priority including the visibility priority, the exposure priority, and the severity priority.

16. The method of claim 9, further comprising:
parsing the issue to obtain priority criterion data relating to at least one priority criterion which is unrelated to respective dates or times of the reported issue;
automatically prioritize the issues by applying to the issue the issue priority based at least partially on the associated priority criterion data; and
communicate the issue to an agent based on the issue priority.

17. A computer-readable storage device comprising instructions which, when implemented by a hardware processor of a machine, cause the machines to perform operations comprising:
monitoring a computing network for a violation of a parameter defined by rules, the violation reported in an issue report categorized by a predefined issue type;
identifying, using the hardware processor of the machine, an issue description and location identifying information where an issue of the issue report occurs;
performing a look up for an exposure value from an issue exposure table stored in one or more networked databases, the exposure value determined based on data parsed from the issue;
performing a look up for a severity value from an issue severity table stored in the one or more networked databases, the severity value based on an issue type of the issue, the severity table comprising records that include a predetermined severity level for each existing issue type;
generating a merged issue priority for the issue by merging a plurality of different priority types, the plurality of different priority types including an exposure priority indicating a potential loss or liability and a severity priority, the exposure priority being based on the exposure value and the severity value, the merged issue priority used to automatically prioritize the issue;
determining of a predefined response activity for responding to the issue; triggering an action based on the predefined response activity; and
logging the issue and the response activity.

18. The computer-readable storage device of claim 17, wherein the operations further comprise:
determining whether the issue corresponds to existing issue entries in an issue queue; and
reconciling and aggregating issue data for the issue report with corresponding existing issue entries in the issue queue resulting in a reduced number of discreet entries in the issue queue.

19. The computer-readable storage device of claim 17, wherein the operations further comprise accessing historical data associated with the issue report, wherein the historical data is used to determine an accuracy of the issue report.

20. The computer-readable storage device of claim 17, wherein the operations further comprise:
parsing the issue to obtain priority criterion data relating to at least one priority criterion which is unrelated to respective dates or times of the reported issue;
automatically prioritize the issues by applying to the issue the issue priority based at least partially on the associated priority criterion data; and
communicate the issue to an agent based on the issue priority.

* * * * *